(12) United States Patent
Iizawa et al.

(10) Patent No.: US 8,774,620 B2
(45) Date of Patent: Jul. 8, 2014

(54) OPTICAL TRANSMISSION SYSTEM AND OPTICAL TRANSMISSION METHOD

(75) Inventors: Kento Iizawa, Yokohama (JP); Tetsuya Uda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 519 days.

(21) Appl. No.: 13/073,450

(22) Filed: Mar. 28, 2011

(65) Prior Publication Data
US 2011/0243558 A1 Oct. 6, 2011

(30) Foreign Application Priority Data

Apr. 2, 2010 (JP) ................................. 2010-085636

(51) Int. Cl.
H04B 10/00 (2013.01)
H04J 14/02 (2006.01)

(52) U.S. Cl.
USPC ....................................... 398/3; 398/1; 398/5

(58) Field of Classification Search
USPC ...................... 398/1–24, 45–57, 83
See application file for complete search history.

(56) References Cited

U.S. PATENT DOCUMENTS

| 6,061,157 A * | 5/2000 | Terahara ............................ 398/1 |
| 2004/0208561 A1 * | 10/2004 | Kinoshita et al. ............... 398/59 |
| 2004/0218526 A1 | 11/2004 | Kim et al. |
| 2005/0286896 A1 * | 12/2005 | Kinoshita et al. ............... 398/83 |
| 2006/0018658 A1 | 1/2006 | Mori |

FOREIGN PATENT DOCUMENTS

| JP | 2002-033703 A | 1/2002 |
| JP | 2003-046456 | 2/2003 |
| JP | 2004-336771 | 11/2004 |
| JP | 2006-033542 | 2/2006 |

OTHER PUBLICATIONS

Office Action dated Jul. 30, 2013 issued in connection with Japanese Application No. 2010-085636.
Japanese Patent Office action on application 2010-085636 mailed Jan. 7, 2014; pp. 1-5, with partial English translation.

* cited by examiner

Primary Examiner — Daniel Dobson
(74) Attorney, Agent, or Firm — Foley & Lardner LLP

(57) ABSTRACT

An OADM device without a transponder unit does not mount the transponder in charge of separating a fault between the OADM device and an external device and is difficult to perform fault separation and to identify a fault interval. To solve this problem, for the OADM device without the transponder unit, the optical loop back function is provided by using such a switch as, for example, 2×2 optical switch. By identifying a fault developing interval by the use of the optical loop back function, fault separation at the time of occurrence of a fault can be facilitated.

16 Claims, 14 Drawing Sheets

OPTICAL TRANSMISSION SYSTEM AND OPTICAL TRANSMISSION METHOD

INCORPORATION BY REFERENCE

The present application claims priority from Japanese application JP2010-085636 filed on Apr. 2, 2010, the content of which is hereby incorporated by reference into this application

BACKGROUND OF THE INVENTION

The present invention relates to a transmission apparatus and a transmission method for transmitting optical signals subject to multiple-wavelength.

In order to reduce system costs while increasing the capacity of communications, a multiple-wavelength optical transmission technique for communicating a plurality of signal light rays of different wavelengths by tying them up into a single optical fiber has generally been applied to an optical communication system. In an actual system, a multiple-wavelength functional device, that is, a wavelength multiplexer device is installed which is constituted by a light ray insert unit adapted to bundle a plurality of signal light rays of different wavelengths into a single optical fiber, a light ray split unit adapted to split, wavelength by wavelength, the bundled plural signal light rays, and an optical fiber amplifier unit adapted to compensate an optical signal for a loss generated in an optical fiber representing a transmission path between two remotely distant locations. Provided for the wavelength multiplexer device is a transponder which converts a light signal into that having a wavelength suitable for multiple-wavelength. By using the wavelength multiplexing device and an interface device in combination, inexpensive communication can be offered over a long distance.

Reference is now made to FIG. 1 illustrating a general network configuration using a multiple-wavelength transmission system. Structurally, the network includes an access quarter 1-4 for offering FTTH (Fiber To The Home) service to subscribers in a unit of areas by using an OLT (Optical Line Terminal) unit 1-2 and an ONU (Optical Network Unit) 1-3, an edge quarter 1-6 for concentrating communications from subscribers in area units into a group of areas by using a switch 1-5 of a plurality of L2's (Layers 2), a metro quarter 1-7 for concentrating the communications concentrated by the L2 (Layer 2) switch into a unit of towns and cities, and a core quarter 1-8 for efficiently transmitting a large capacity of communications concentrated in a unit of towns and cities over a long distance between metropolitans. In the present network, an ODAM (Optical Add Drop Multiplexer) device as designated at reference numeral 1-1 represents an optical transmission system used for concentrating into a single location the communications scattered in a relatively wide range.

Turning to FIG. 2, the OADM device 1-1 is generally constructed as exemplified therein. In FIG. 2, two OADM devices 1-1 are so configured as to oppose to each other with intervention of two transmission paths 2-1. The OADM device 1-1 includes a wavelength multiplexer unit 2-5 adapted either to take out a desired signal from a plurality of light signals subject to multiple-wavelength or to pile the desired signal up again into a group of plural signals by causing the desired signal to undergo multiple-wavelength, a transponder unit 2-3 adapted to either suitably convert a signal split from the wavelength multiplexer unit 2-5 by discriminating it from a subscriber signal accommodated in the OADM device 1-1 or to suitably convert the subscriber signal and cause it to undergo multiple-wavelength by means of a splitter/inserter, and a supervisory control unit 2-4 adapted to perform supervisory control of the wavelength multiplexer unit 2-5 and transponder unit 2-3.

A supervisory control light controlling unit 2-2 causes a signal light ray 2-7 outputted from the transponder unit 2-3 and a supervisory control tight ray 2-6 outputted from a supervisory control light processing unit 2-4-1 under the control of the supervisory control unit 2-4 to undergo multiple-wavelength and transmits them to the transmission path 2-1. Also, the supervisory control light controlling unit 2-2 causes the signal light ray 2-7 subject to multiple-wavelength and received from the transmission path 2-1 and the supervisory light ray 2-6 from the supervisory control light processing unit 2-4-1 to undergo wavelength splitting, respectively, and the individual split light rays are inputted to the transponder unit 2-3 and the supervisory control unit 2-4, respectively.

In the OADM device 1-1 shown in FIG. 2, the signal light ray 2-7 propagates through a path indicated at dotted line and the supervisory control light ray 2-6 propagates from the supervisory control light processing unit 2-4-1 through a path as indicated at solid line. More particularly, the light ray from the supervisory control light processing unit 2-4-1 is split by means of the supervisory control light controlling unit 2-2 in the opposing OADM device 1-1 and inputted to the supervisory control light processing unit 2-4-1 in the opposing OADM device 1-1. The signal light ray 2-7 passes through the supervisory control light controlling unit 2-2 and is then inputted to the wavelength multiplexer unit 2-5.

Turning to FIG. 3, an explanation will diagrammatically be given to a multiple-wavelength light ray having a signal wavelength group 3-2 subject to multiple-wavelength and a supervisory control signal 3-1. In a general OADM device 1-1, there exist, as described in JP-A-2003-046456, for example, the signal group of plural signals subject to multiple-wavelength carrying actual communication data and the supervisory control signal 3-1 adapted to materialize communication of signals used for executing mutual control and supervisory of the OADM devices 1-1 located remotely. In FIG. 3, the signal wavelength group 3-2 of 32 signals subject to multiple-wavelength and the single supervisory control signal 3-1 arranged on the side of short waves are illustrated but when the supervisory control signal 3-1 arranged on the side of long waves or when a plurality of supervisory control signals 3-1 are arranged, a number other than 32 of signal waves will sometimes be subjected to multiple-wavelength.

In the general OADM device 1-1, the function to take out a desired signal from a plurality of optical signals or execute multiple-wavelength of the desired signal and to pile it up into the group of plural signals is executed in the wavelength multiplexer unit 2-5. For communication of the supervisory control signal between the remotely located OADM devices 1-1, only the supervisory control signal is split from the light rays subject to multiple-wavelength by means of the supervisory control light controlling unit 2-2 arranged in the input port from the transmission path 2-1, for example, and is then inserted or merged to the signal wavelength by means of the supervisory control light controlling unit 2-2 arranged in the output to port of the transmission path 2-1.

Reference is now made to FIG. 4 to indicate how an external device 4-1 such as a router is connected to the transponder unit 2-3 and the wavelength multiplexer unit 2-5. The transponder unit 2-3 is comprised of a multiple-wavelength side interface section 2-3-1 and an external device side interface section 2-3-4. The multiple-wavelength side interface section has a transmitter 2-3-2 and a receiver 2-3-3. The transmitter 2-3-2 converts an optical signal to that having a wavelength suitable for multiple-wavelength and sends it to the wavelength multiplexer unit 2-5 and the receiver 2-3-3 receives an optical signal sent from the wavelength multiplexer unit 2-5. Similarly, the external device side interface section 2-3-4 has a transmitter 2-3-6 and a receiver 2-3-5 to thereby receive an optical signal from the external device 4-1 or transmit an optical signal thereto. Similarly, the external device 4-1 has a transmitter 4-2 for transmission to the transponder unit 2-3 and a receiver 4-3 for reception from the transponder unit 2-3. Since the signal transmitted from the external device 4-1 does not always have a wavelength suitable for multiple-wavelength, an optical signal transmitted from the transmitter 4-2 of external device 4-1 cannot be inputted to the wavelength multiplexer unit 2-5 while keeping its wavelength intact.

It is necessary for the OADM device 1-1 of the general construction as above to add a transponder unit 2-3 each time it connects to the external device 4-1. As a result, in case a plurality of external devices 4-1 are connected, the number of transponder units 2-3 to be installed must be increased and consequently, the cost of the system rises.

To cope with this problem, the wavelength of a signal outputted from the transmitter 4-2 of external device 4-1 is made in advance suitable for multiple-wavelength to permit connection to the wavelength multiplexer unit 2-5 without resort to the transponder unit 2-3, thus reducing the system cost.

The transponder unit 2-3, however, does not function merely to convert the wavelength of optical signal into that suitable for multiple-wavelength but is used to separate and identify a location where a fault occurs inside the network using the OADM device 1-1 and therefore, the aforementioned expedient needs a construction for separating a fault and identifying a fault interval during occurrence of the fault, eventually raising a problem that the running cost increases and as a result, the total cost is raised.

In order to facilitate handling the fault generation in the OADM device without the transponder unit 2-3 as described above, two countermeasures of 1) intensifying the function of supervisory the external device 4-1 has and 2) intensifying the function of supervisory the OADM device 1-1 has are conceivable.

Of them, in connection with the method for intensifying the supervisory function provided for the external device 4-1 as in 1), a method of intensifying the function to supervise a physical layer such as for optical input/output supervisory provided for the external device 4-1 and a method of intensifying the function to supervise a data link layer and a network layer such as Inthernet (registered trade mark) OAM, MPLS OAM are conceivable. Any of the supervisory functions, however, does not supervise the inside of OADM device but gives the end-to-end supervisory function executed externally of the OADM device. Therefore, when a fault occurs inside the network using the OADM device, specified information cannot be obtained as to where the fault occurs inside the OADM device and how the fault is to be dealt with. In other words, so long as the mere end-to-end supervisory from the outside is executed, the fault developing inside the OADM device cannot be separated specifically.

Further, solving the present problem by the provision of the new function for the external device 4-1 means that the external device 4-1 having already been introduced into the network cannot be utilized because it lacks the new function.

In connection with the method of intensifying the supervisory function the OADM device 1-1 has as mentioned in 2) above, the presence/absence of a fault can be confirmed in respect of each optical signal by providing the function to supervise individual optical signals undergoing multiple-wavelength and accordingly, the supervisory function can be intensified. But the supervisory function as above needs to be provided by the number of accommodated multiple-wavelengths, making the construction complicated and raising the cost of the OADM device per se. Further, by providing the function to analyze optical characteristics as in the case of an optical spectrum analyzer, supervisory of each optical signal can be intensified but the construction becomes complicated and besides, because of very high expensiveness of the optical spectrum analyzer, the cost of the OADM device 1-1 per se still arises.

As will be seen from the foregoing, in the OADM device without the transponder unit 2-3, separation of a fault developing in the network using the OADM device 1-1 must be realized by avoiding complexity and expensiveness.

SUMMARY OF THE INVENTION

In identifying a fault developing location in the OADM device devoid of the transponder unit, the optical loop back function is used by the use of an inexpensive optical switch of, for example, 2×2 (2 inputs, 2 outputs to decide the presence/absence of occurrence of a fault.

Since the optical loop back can be carried out at a plurality of locations in the OADM device 1-1, the presence/absence of optical loop back light rays can be confirmed in sequence while executing sequentially the optical loop back at the plural locations. Accordingly, by observing an optical signal subject to loop back, an interval in which a fault develops can be identified and an action to recover from the fault can be taken.

Exemplarily, an optical transmission apparatus according to the present invention comprises a wavelength multiplexer unit for multiplexing wavelengths of input/output light rays, a first optical switch for inputting/outputting light rays to/from the wavelength multiplexer unit, a control light processing unit for inputting/outputting control light rays, a control light controlling unit for performing multiplexing or splitting between the control light ray and the light ray delivered out of the wavelength multiplexer unit, and a supervisory control unit for controlling on/off of the function to fold the inputted light ray in respect of the first optical switch. Then, the optical transmission apparatus may further comprise a second optical switch arranged between the control light processing unit and the control light controlling unit and the supervisory control unit may further control on/off of the function to fold the inputted light ray in respect of the second optical switch. Further, the optical transmission apparatus may be connected to another optical transmission apparatus through a transmission paths to mutually transmit/receive light rays to/from the different optical transmission apparatus.

Exemplarily, an optical transmission method according to the present invention is based on an OADM device having a wavelength multiplexer unit, a first optical switch, a control light processing unit and a control light controlling unit and comprises a step of multiplexing wavelengths of input/output light rays by means of the wavelength multiplexer unit, a step of switching an light ray delivered out of the wavelength multiplexer unit by means of the first optical switch, a step of causing the control light controlling unit to multiplex the light ray switched by the first optical switch with the control light ray the control light processing unit outputs and transmitting a multiplexed light ray to an opposing OADM device, a step of causing the control light controlling unit to split a light ray received from the opposing OADM device into a control light ray and another light ray, and a step of inputting the different light ray to the first optical switch to cause it to switch the different light ray, wherein when the first optical switch has its input light folding function turned on, the inputted light ray is folded and transmitted to an input originator. Then, the optical transmission method may further comprise a step of causing a second optical switch arranged between the control light processing unit and the control light controlling unit to perform switching between the control light ray delivered out of the control light processing unit and another light ray split by means of the control light controlling unit, wherein when the second optical switch has its input light folding function turned on, the inputted light ray is folded and transmitted to the input originator.

According to the teachings of the present invention as above, in the OADM device without the transponder unit 2-3, a fault developing inside the network constituted by the OADM device can be separated easily while avoiding expensiveness due to complexity of the construction.

Other objects, features and advantages of the invention will become apparent from the following description of the embodiments of the invention taken in conjunction with the accompanying drawings.

DESCRIPTION OF THE EMBODIMENTS

Figure 1:
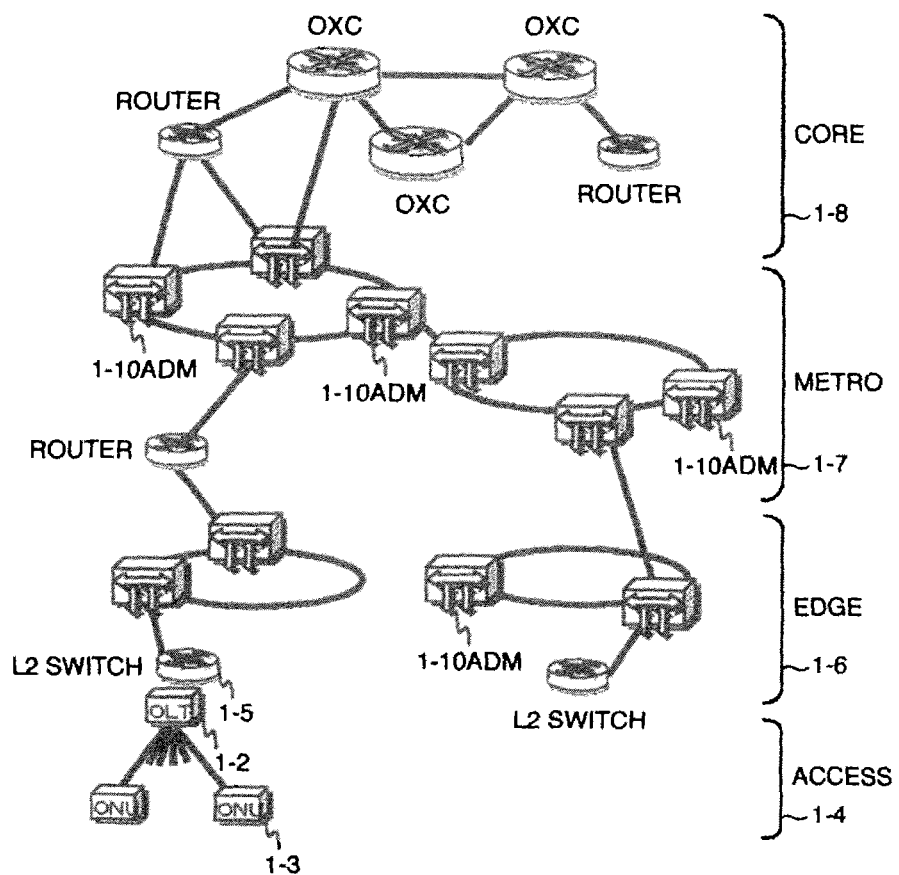
FIG. 1 is a diagram illustrating an example of schematic configuration of the whole network.
Figure 2:
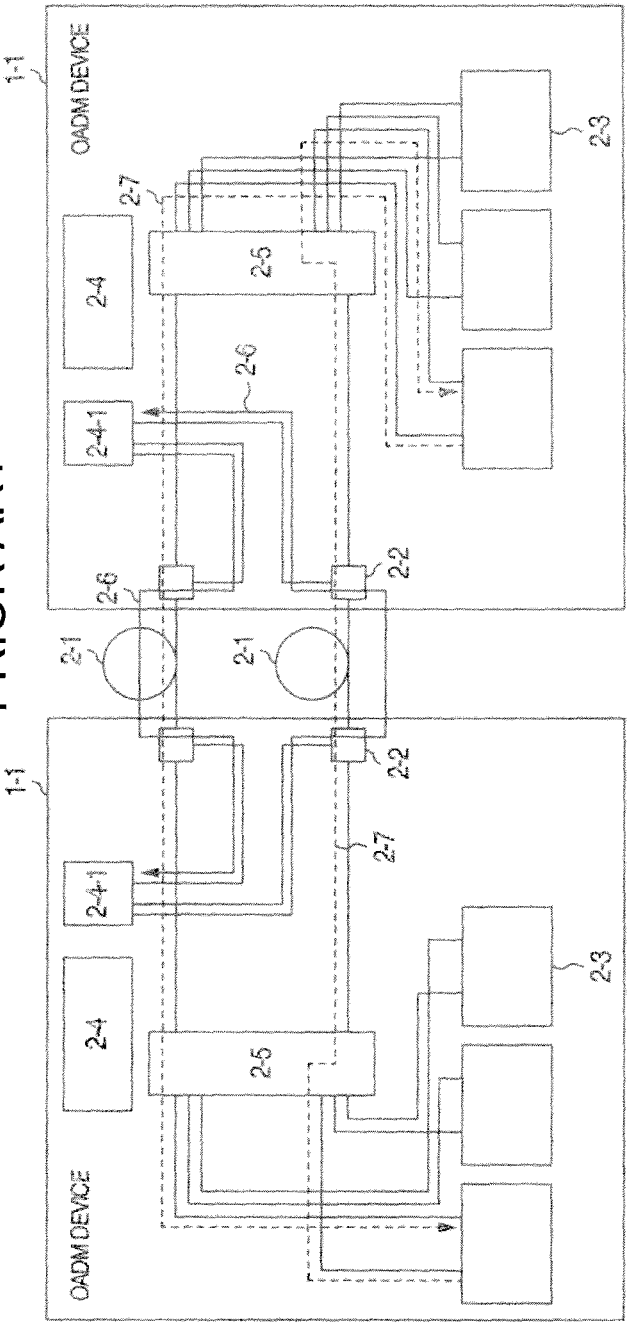
FIG. 2 is a block diagram illustrating an example of schematic construction of a general OADM device.
Figure 3:
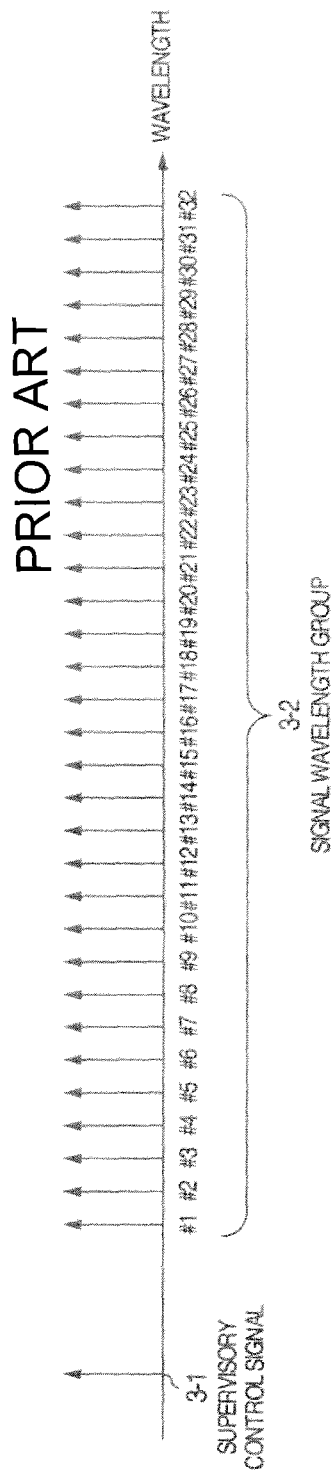
FIG. 3 is a diagram showing an example of a multiple-wavelength signal.
Figure 4:
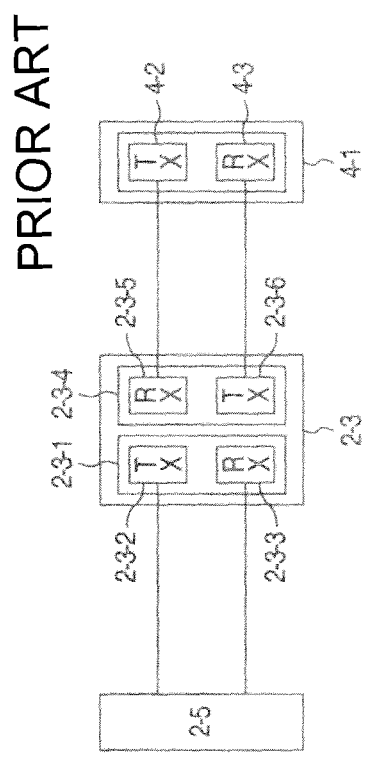
FIG. 4 is a block diagram illustrating an example of connection of the OADM device to an external device.
Figure 5:
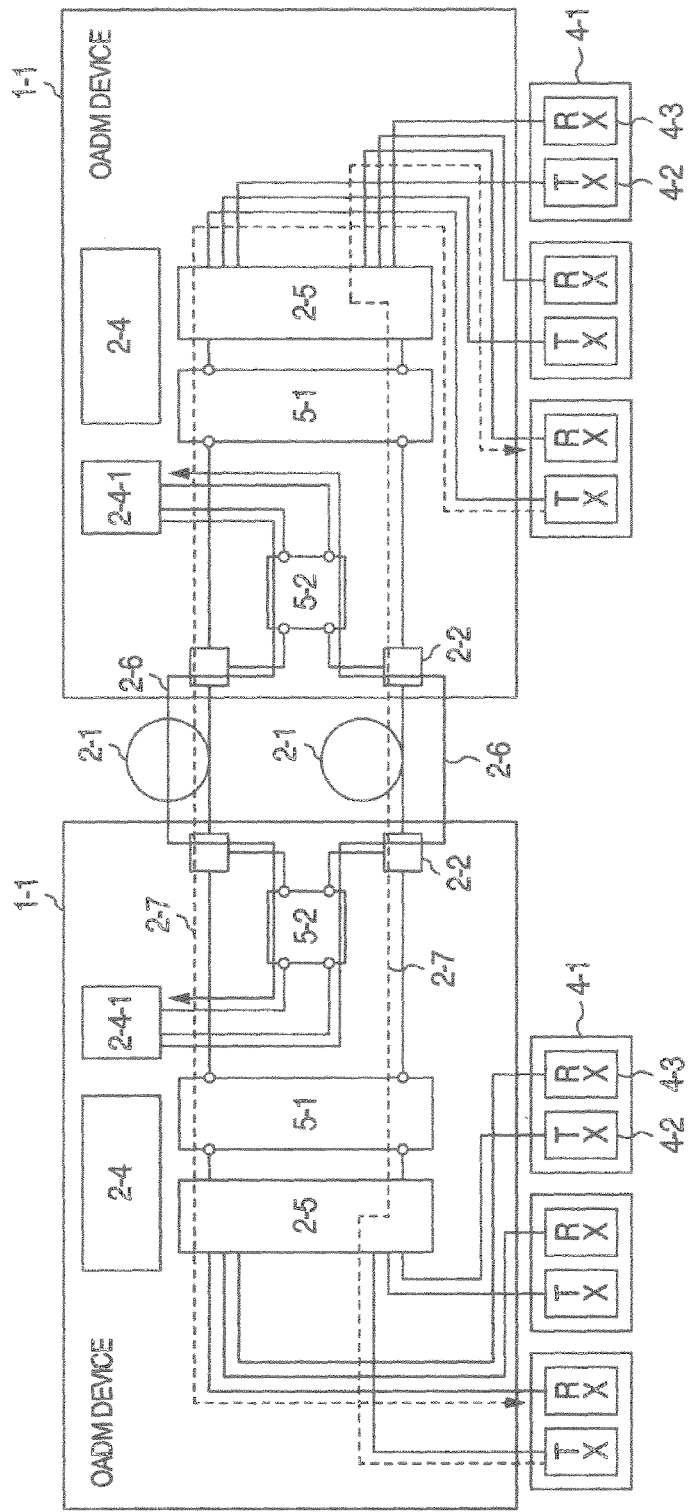
FIG. 5 is a block diagram illustrating an example of an OADM device devoid of a transponder unit.

Reference is now made to FIG. 5 useful to explain as a first embodiment an OADM device which uses 2×2 optical switches, lacks a transponder unit and has a wavelength multiplexer unit 2-5 directly connected with an external device 4-1. In the figure, a plurality of external devices 4-1 are connected to a single OADM device but for simplicity of illustration, reference numerals 4-1, 4-2 and 4-3 are designated to the rightmost external device connected to the single OADM device. This holds true for illustration of the external device 4-1 in the following drawings. A signal light ray 2-7 outputted from the transmitter 4-2 of external device 4-1 is inputted to the wavelength multiplexer unit 2-5 and then it passes through a 2×2 optical switch 5-1. Further, a supervisory light ray 2-6 outputted from the supervisory control light processing unit 2-4-1 passes through a 2×2 optical switch 5-2 and its wavelength is multiplexed with the signal light ray 2-7 outputted from the transmitter 4-2 of external device 4-1 in a supervisory control light controlling unit 2-2. The resulting signal light ray passes through the transmission path 2-1 and is then inputted to the adjoining adjacent OADM device 1-1. The signal light ray 2-7 inputted to the OADM device 1-1 is split from the supervisory light ray 2-6 in the supervisory control light controlling unit 2-2 of the adjacent OADM device 1-1, passed subsequently through the 2×2 optical switch 5-1 so as to be inputted to the wavelength multiplexer unit 2-5 and thereafter, inputted to the receiver 4-3 of external device 4-1. The wavelength of supervisory light ray 2-6 is split from the signal light ray 2-7 by means of the supervisory control light controlling unit 2-2 and thereafter, passed through the 2×2 optical switch 5-2 so as to be inputted to the control light processing unit 2-4-1.

Figure 6:
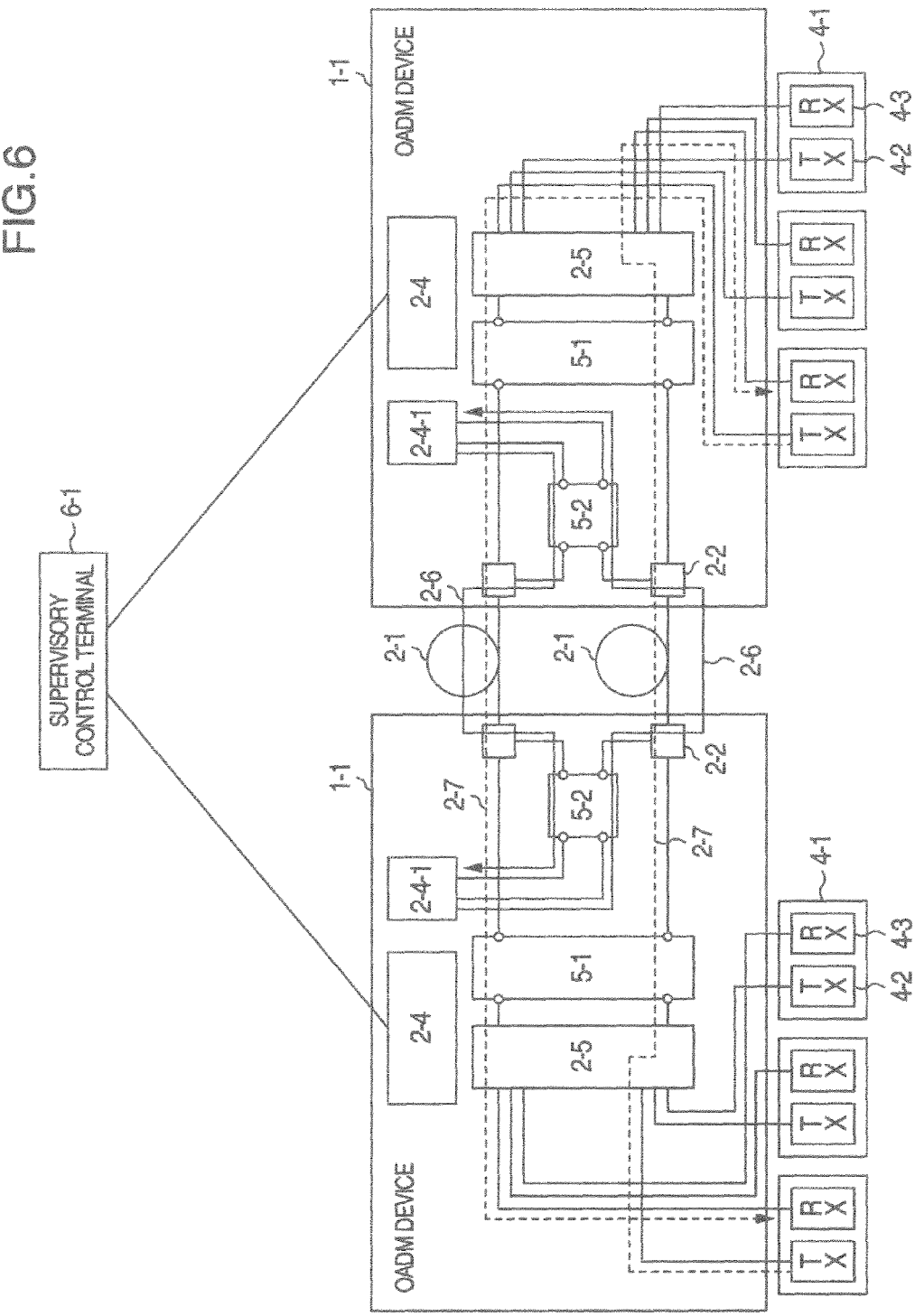
FIG. 6 is a block diagram illustrating an example of the OADM device combined with a supervisory control terminal for remote supervisory control.

Turning to FIG. 6, an OADM device configuration will be described in which OADM devices 1-1 located remotely from each other are combined with a supervisory control terminal 6-1 for remotely controlling the OADM devices 1-1. The supervisory control terminal 6-1 is connected to a supervisory control unit 2-4 of each OADM device and with a command from the supervisory control terminal 6-1, 2×2 optical switches 5-1 and 5-2 mounted on the OADM device 1-1 installed remotely from the terminal 6-1 can be driven. Namely, the 2×2 optical switch at an arbitrary location can be driven remotely by the supervisory control terminal 6-1 to ensure that the optical loop back function to be described later can be carried out at the arbitrary location. To add, the supervisory control terminal 6-1 in FIG. 6 is connectable to the OADM device 1-1 locatable at an arbitrary location and therefore, by using the OADM device, the optical loop back function to be detailed later can also be practiced at the arbitrary location. Further, the supervisory control unit 2-4 can also be provided self-controllably with the function to execute the optical loop back to be described later.

Figure 7A:
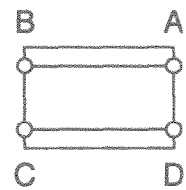
FIG. 7A is a diagram for explaining the operation of an optical switch adapted to materialize the optical loop back function.
Figure 7B:
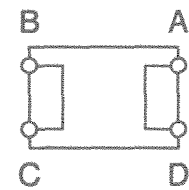
FIG. 7B is a diagram for explaining the operation of an optical switch adapted to materialize the optical loop back function.

The operation of the 2×2 optical switches 5-1 and 5-2 to be utilized in the configuration of FIG. 5 will be described with reference to FIGS. 7A and 7B. Each of the 2×2 optical switches 5-1 and 5-2 has four ports A, B, C and D and all of the ports can be used for input and output. The optical switch is conditioned internally to have at least two statuses, in one of which the port A and the port B are connected together and the port C and the port D are connected together and in the other of which the port A and the port D are connected together and the port C and the port B are connected together. By using the 2×2 optical switches 5-1 and 5-2 operating as above, the optical loop back function is materialized. In normal operation status, the optical switch is switched as shown in FIG. 7A to pass a signal from a port (for example, A) opposing one end of the signal path of OADM device in the signal light ray transmission direction to a port (for example, B) opposing the other end. When the loop back is necessary, the optical switch is switched as shown in FIG. 7B to fold a signal from a port (for example, A) opposing one end of the signal path of OADM device in the signal light ray transmission direction to a port (for example, D) for transmission of the signal to the one end. By folding the signal inputted to the optical switch as shown in FIG. 7B, the optical loop back function can be materialized.

Figure 8A:
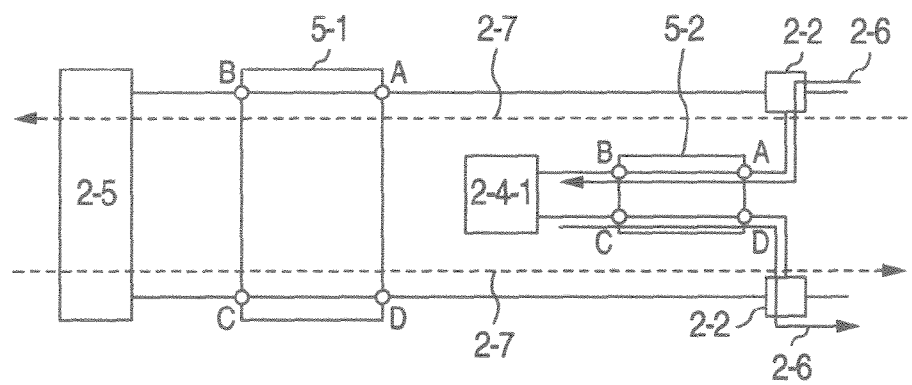
FIG. 8A is a block diagram illustrating an example of an OADM deuce with the optical loop back function.
Figure 8B:
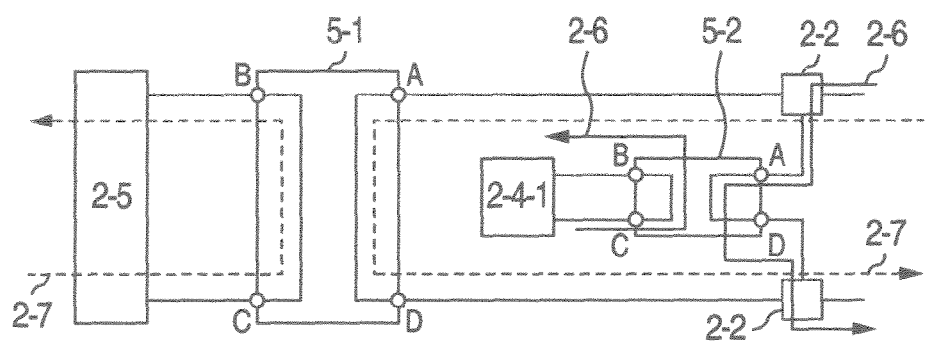
FIG. 8B is a block diagram illustrating an example of an OADM device with the optical loop back function.

Referring now to FIGS. 8A and 8B, the operation of the OADM device 1-1 having the optical loop back function set up by using the operation of the 2×2 optical switch explained in connection with FIGS. 7A and 7B will be described. Illustrated in FIG. 8A is the normal status of 2×2 optical switches 5-1 and 5-2 in which a signal light ray 2-7 inputted from the right passes through the optical switch 5-1 from port A to port B, reaching the wavelength multiplexer unit 2-5. On the other hand, a signal light ray 2-7 outputted from the wavelength multiplexer unit 2-5 passes through the 2×2 optical switch 5-1 from port C to port D and outputted to the right. Further, the wavelength of a supervisory light ray 2-6 is split by means of the supervisory control light controlling unit 2-2 and passes through the 2×2 optical switch 5-2 from port A to port B so as to be inputted to the control light processing unit 2-4-1. A supervisory light ray 2-6 outputted from the control light processing unit 2-4-1, on the other hand, passes through the 2×2 optical switch 5-2 from port C to port D, undergoes multiple-wavelength in the supervisory control light controlling unit 2-2 and is then outputted to the right. Illustrated in FIG. 8B are the statuses of 2×2 optical switches 5-1 and 5-2 under the condition that the loop back function is operated, showing that a signal light ray 2-7 inputted from the right undergoes loop back from port A to port D in the optical switch 5-1 and it is delivered as it is to an originator of the signal light ray 2-7. A signal light ray 2-7 outputted from the wavelength multiplexer unit 2-5 undergoes loop back in the 2×2 optical switch 5-1 from port C to port B and is delivered to the input originator of the signal light ray 2-7. Further, a supervisory light ray 2-6 inputted from the right undergoes wavelength splitting in the supervisory control light controlling unit 2-2, undergoes loop back in the 2×2 optical switch 5-2 from port A to port D, again undergoes multiple-wavelength in the supervisory control light controlling unit 2-2 and thereafter it is delivered to an input originator. Further, a supervisory light ray 2-6 outputted from the control light controlling unit 2-4-1 undergoes loop back in the 2×2 optical switch 5-2 from port C to port B and it is again inputted as its is to the control light controlling unit 2-4-1.

By using the 2×2 optical switches explained in connection with FIGS. 7A and 7B in this manner, the loop back function can be materialized on the optical level as explained in connection with FIGS. 8A and 8B.

Next, the procedures for actually identifying an interval in which a fault develops in the OADM device with the loop back function will be described.

Figure 9:
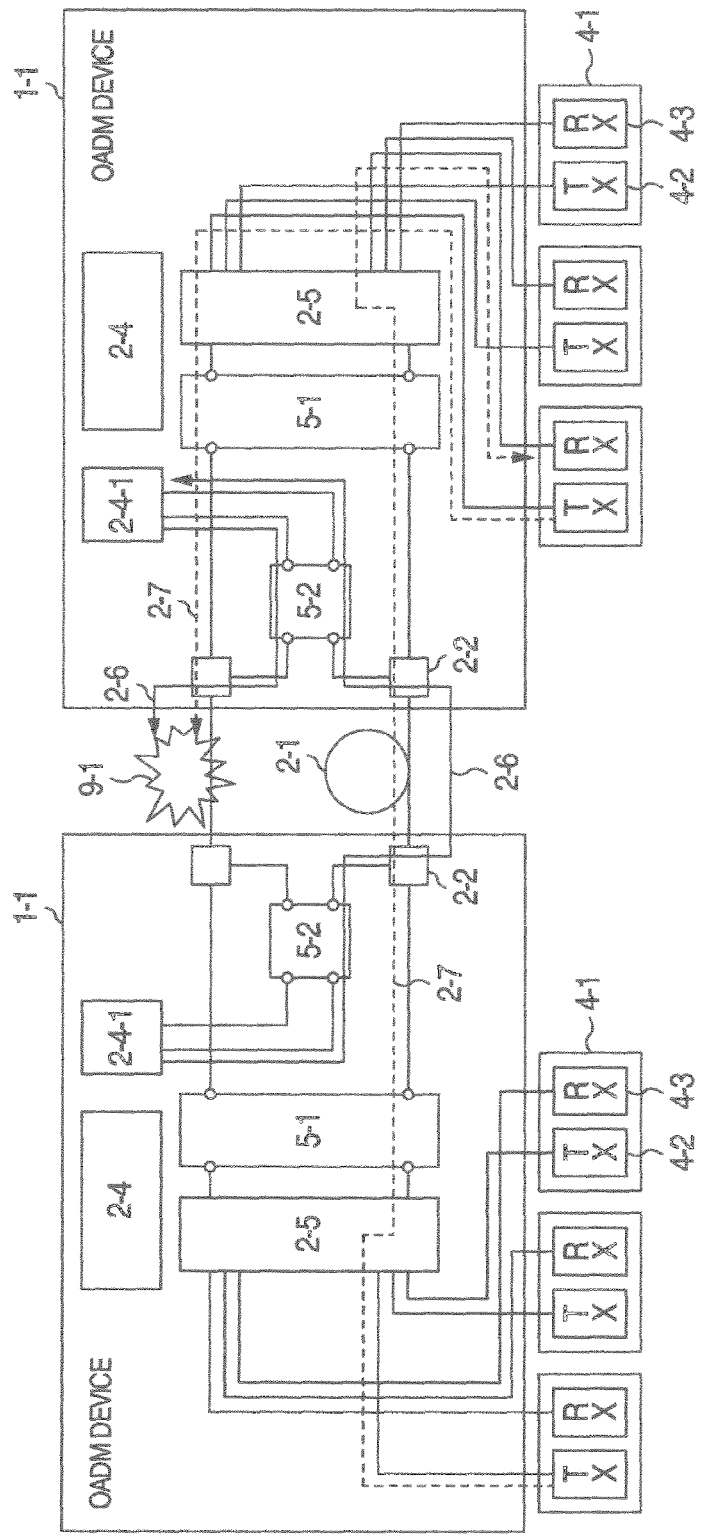
FIG. 9 is a block diagram useful to explain a status in which a fault occurs.
Figure 10:
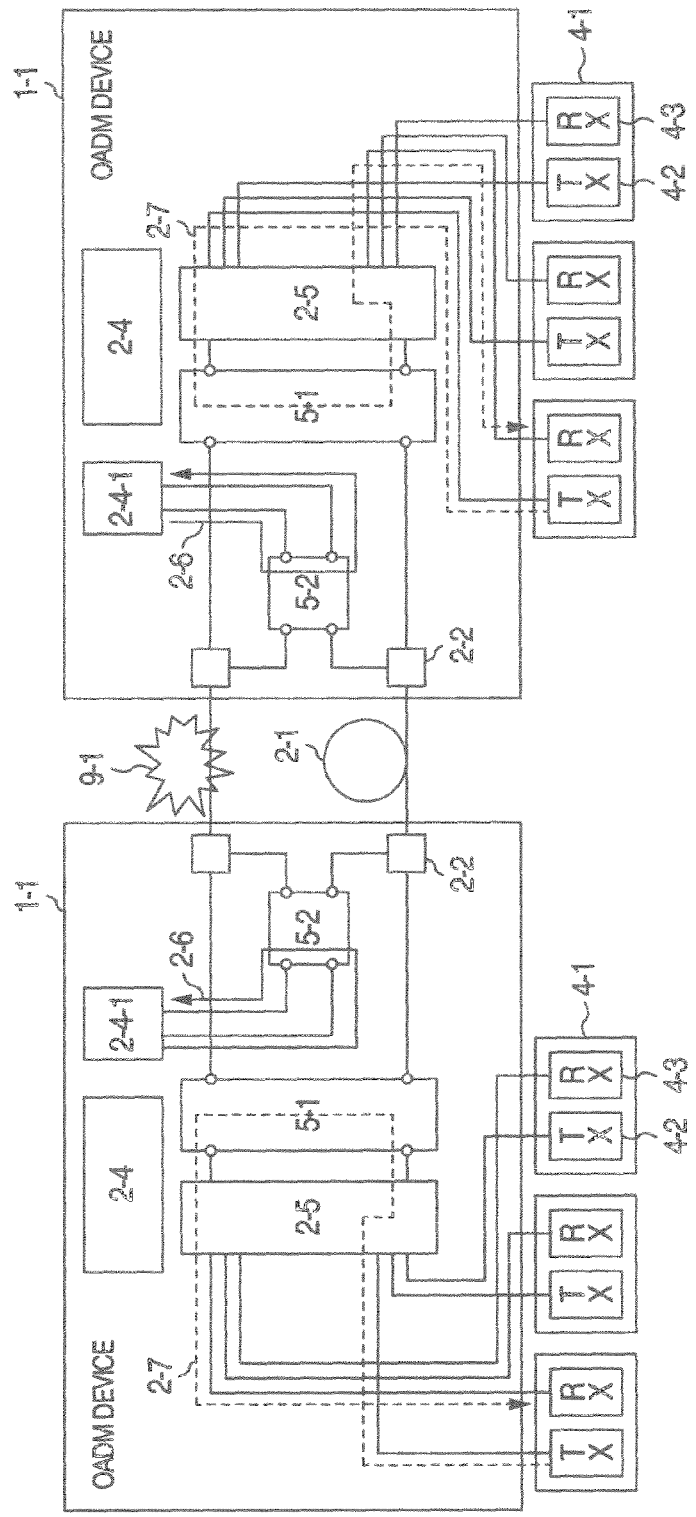
FIG. 10 is a block diagram for explaining the operation of the optical switch when a fault develops in the OADM device with the optical loop back function.

Illustrated in FIG. 9 is an instance where a fault 9-1 occurs between two adjacent OADM devices. Since a signal light ray 2-7 to be inputted to the receiver 4-3 of external device 4-1 and a supervisory light ray 2-6 to be inputted to the control light processing unit 2-4-1 cannot be transmitted, detection is executed to determine which point the fault develops at. But, under the condition that the present loop back function is not applied, it cannot be identified which location on the communication path the fault occurs at, with the result that an action to recover the path from the fault generation cannot be taken. Contrary to this, when the loop back is to be executed through the 2×2 optical switches 5-1 and 5-2, a signal light ray 2-7 and a supervisory light ray 2-6 pass through such a route as will be explained with reference to FIG. 10. In the event that the signal light ray 2-7 to be inputted to the receiver 4-3 of external device 4-1 and the supervisory light ray 2-6 to be inputted to the control light processing unit 2-4-1 cannot be transmitted, the fault occurrence is to be detected and therefore, the optical switch is driven to switch over the loop back ON/normal operation of the loop back function. More specifically, in order to identify a fault developing location, the optical switch is switched over with a command from the supervisory control terminal or by means of the supervisory control unit and the presence/absence of a folding signal is examined.

When loop back setting is carried out in the 2×2 optical switch 5-1 in the left side OADM device 1-1, normal inputting of the signal light ray 2-7 to the receiver 4-3 of external device 4-1 can be confirmed and therefore, it can be known that a fault does not occur between the external device 4-1 and the wavelength multiplexer unit 2-5. Similarly, when loop back setting is carried out in the 2×2 optical switch 5-1 in the right side OADM device 1-1, normal inputting of the signal light ray 2-7 to the receiver 4-3 of external device 4-1 can be confirmed and therefore, it can be known that a fault does not occur either between the external device 4-1 and the wavelength multiplexer unit 2-5 in the right side OADM device 1-1 as in the case of the left side OADM device 1-1. Further, in the left side and right side OADM devices 1-1, a supervisory light ray 2-6 can also be received no ally in the control light controlling unit 2-4-1 by setting the loop back to the 2×2 optical switch 5-2 and therefore, it can be found that a fault does not occur in the route for the supervisory light ray 2-6. Setting of the loop back function for fault detection in the OADM device can be rendered ON in either the optical switch 5-1 for signal light ray or the optical switch 5-2 for supervisory light ray or in both of them. With the both optical switches are involved for setting, a decision can be made as to which one of the signal light ray route and the supervisory light ray route the fault occurs in.

Figure 11:
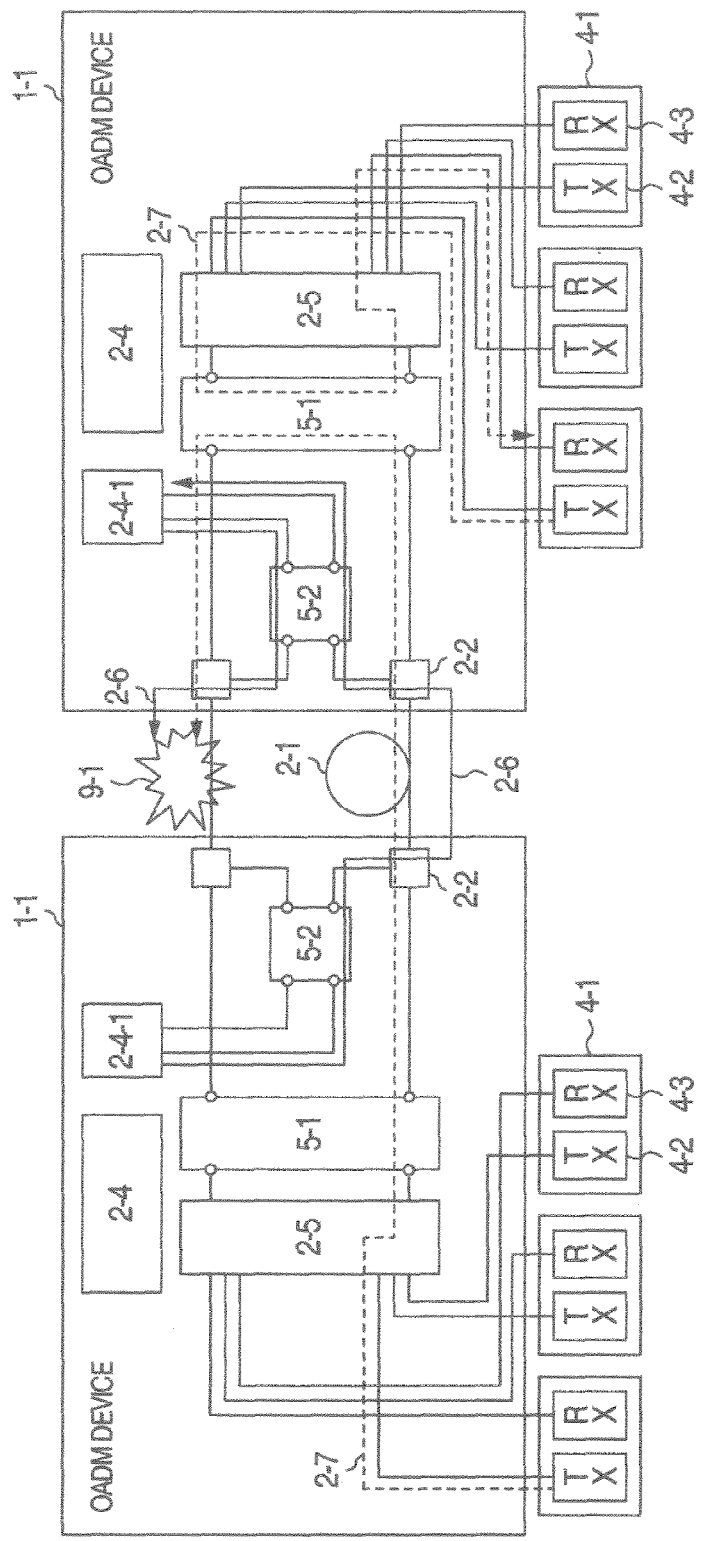
FIG. 11 is a block diagram for explaining the operation of the optical switch when a fault develops in the OADM device with the optical loop back function.

Illustrated in FIG. 11 is an instance for explaining routes of signal gat ray 2-7 and supervisory light ray 2-6 when the loop back is set to only the 2×2 optical switch 5-1 in the right side OADM device 1-1, with the other 2×2 optical switch 5-2 and the 2×2 optical switches 5-1 and 5-2 in the left side OADM device 1-1 being set to normal operation. The supervisory light ray 2-6 outputted from the control light processing unit 2-4-1 on the right side does not reach the control light processing unit 2-4-1 of the left side OADM device under the influence of a fault location 9-1. Then, the signal light ray 2-7 outputted from the transmitter 4-2 in the left side external device 4-1 reaches the right side OADM device 1-1 and undergoes the loop back by means of the 2×2 optical switch 5-1 but does not reach the receiver 4-3 in the left side external device 4-1. Under the conditions, it can be identified that a fault occurs in a transmission path from the right side OADM device 1-1 to the left side OADM device 1-1. Thus, with the two OADM devices configured, a decision can be made as to whether a fault occurs in the transmission path between the two OADM devices by confirming whether or not a signal transmitted to the opposing OADM device in which the loop back function of at least part of the optical switches is set to ON is folded and transmitted. Here, if the external device 4-1 is not connected to the OADM device 1-1 and so the OADM device does not have solely the function to transmit the signal light ray 2-7, the fault detection based on the confirmation of the presence/absence of folding of the signal light ray 2-7 will sometimes fail during fault separation. In the event that a fault developing location 9-1 explained in connection with FIG. 11 exits when no external device 4-1 is connected to the OADM device 1-1, for example, the signal light ray 2-7 does not at all exist in essential in the FIG. 11 configuration and the fault developing location 9-1 cannot be identified.

Figure 12:
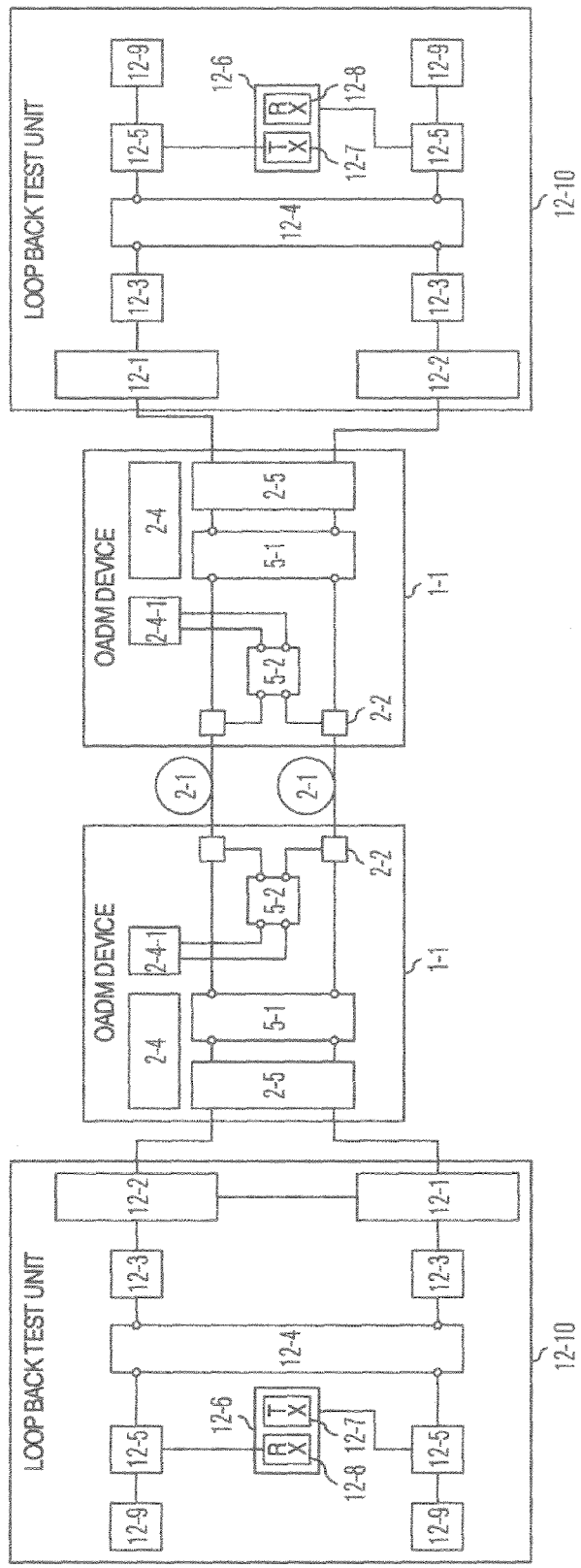
FIG. 12 is a block diagram illustrating an example of configuration set up when a light source for loop back is provided for the OADM device with the optical loop back function.

Referring now to FIG. 12, a second embodiment will be described which is configured when a signal light ray is not inputted from an external device 4-1. In FIG. 12, a loop back test unit 12-10 carrying a light source 12-6 of a test light ray used for execution of a loop back test is connected to an OADM device 1-1. Structurally, two OADM devices 1-1 opposing to each other through the medium of two transmission paths 2-1 are arranged. The loop back test unit 12-10 includes an optical splitter 12-1, an optical switch 12-2, tunable filters 12-3, a 2×2 optical switch 12-4, optical splitters 12-5, the light source 12-6 and input/output sections 12-9. The light source 12-6 is constituted by a transmitter 12-7 and a receiver 12-8. The optical switch 12-4 can be driven remotely with a command from the aforementioned supervisory control terminal 6-1 connected to the supervisory control unit 2-4 or the supervisory control unit 2-4 can drive self-controllably the optical switch 12-4.

Figure 13:
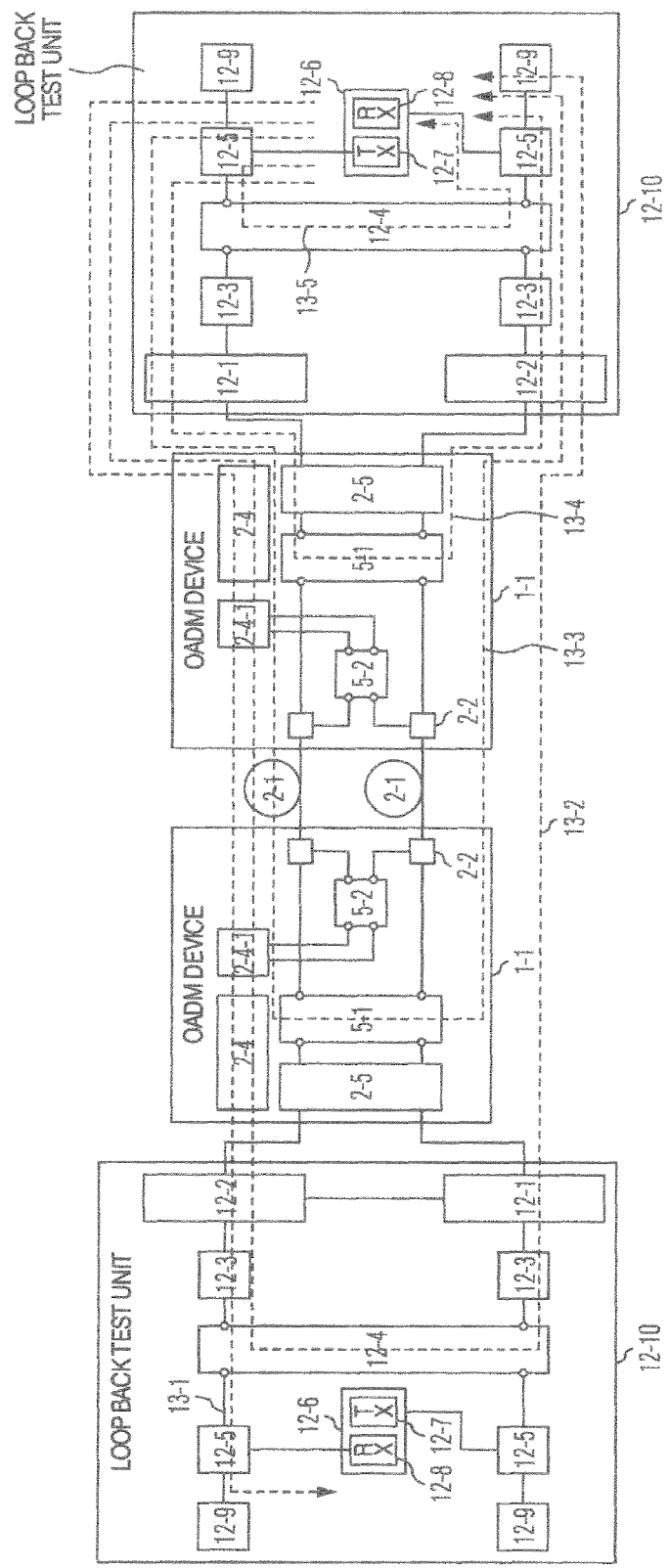
FIG. 13 is a block diagram showing flow of signals in the configuration set up when the light source for loop back is provided for the OADM device with the optical loop back function.

Turning to FIG. 13, an example of loop back test using the second embodiment explained in connection with FIG. 12 is illustrated. When the 2×2 optical switches 5-1 and 12-4 are all set to normal operation, a test light ray 13-1 transmitted from the transmitter 12-7 of light source 12-6 in the right side loop back test unit 12-10 is inputted to the receiver 12-8 of light source 12-6 in the left side loop back test unit 12-10. On the other hand, when the 2×2 optical switch 12-4 is set to loop back function ON, a test light ray 13-5 transmitted from the transmitter 12-7 of light source 12-6 in the right side loop back test unit 12-10 undergoes loop back in the 2×2 optical switch 12-4 mounted inside the right side loop back test unit 12-10 and folded inside its own unit and it is so returned as to be inputted to the receiver 12-8 of light source 12-6 to make confirmation as to whether the test light ray 13-5 is received normally. Next, setting of the 2×2 optical switch 12-4 of loop back test unit 12-10 is returned to normal operation and the 2×2 optical switch 5-1 mounted in the OADM device 1-1 is set to loop back function ON. In this case, a test light ray 13-4 outputted from the light source 12-6 is looped back in the 2×2 optical switch 5-1 and inputted to the receiver 12-8 of light source 12-6, making a confirmation as to whether the test light ray 13-4 is received normally. Further, setting of the 2×2 optical switch 5-1 mounted in the OADM device 1-1 is returned to normal operation and the 2×2 optical switch 5-1 mounted in the opposing OADM device 1-1 is set to loop back function ON. In this case, a test light ray 13-3 outputted from the light source 12-6 is looped back by means of the 2×2 optical switch 5-1 mounted in the opposing OADM device 1-1 and inputted to the receiver 12-8 of light source 12-6, making confirmation as to whether the test light ray 13-3 is received normally. Next, the 2×2 optical switch 5-1 mounted in the opposing OADM device 1-1 is set to loop back OFF, that is, normal operation and the 2×2 optical switch 12-4 mounted in the opposing loop back test unit 12-10 is set to loop back ON. In this case, a test signal ray 13-2 outputted from the light source 12-6 is looped back by means of the 2×2 optical switch mounted in the opposing loop back test unit 12-10 and inputted to the receiver 12-8 of light source 12-6, making confirmation as to whether the test light ray 13-2 is received normally.

The above loop back test is executed by using only the light source 12-6 mounted in the right side loop back test unit 12-10 but by applying a similar test to the opposing loop back test unit 12-10, a fault developing location can be identified in the OADM device not connected with the external device 4-1. It is to be noted that the variable wavelength filter 12-3 arranged on the transmission side needs to coincide with the wavelength of test light ray outputted from the transmitter 12-7 of light source 12-6 and the variable wavelength filter 12-3 arranged on the reception side needs to coincide with the wavelength of test light ray expected to be inputted to the receiver 12-8 of light source 12-6. When the present tunable filter 12-3 is arranged on the transmitter side, a test light ray having an unintended wavelength is prevented from being inputted owing to a fault of transmitter 12-7 of test light ray 13-5. Further, when the present tunable filter 12-3 is arranged on the reception side, even with an unexpected wavelength inputted to the receiver 12-8 for test light ray 13-5 externally thereof, the receiver 12-8 can be prevented from operating erroneously and detecting erroneously.

Figure 14:
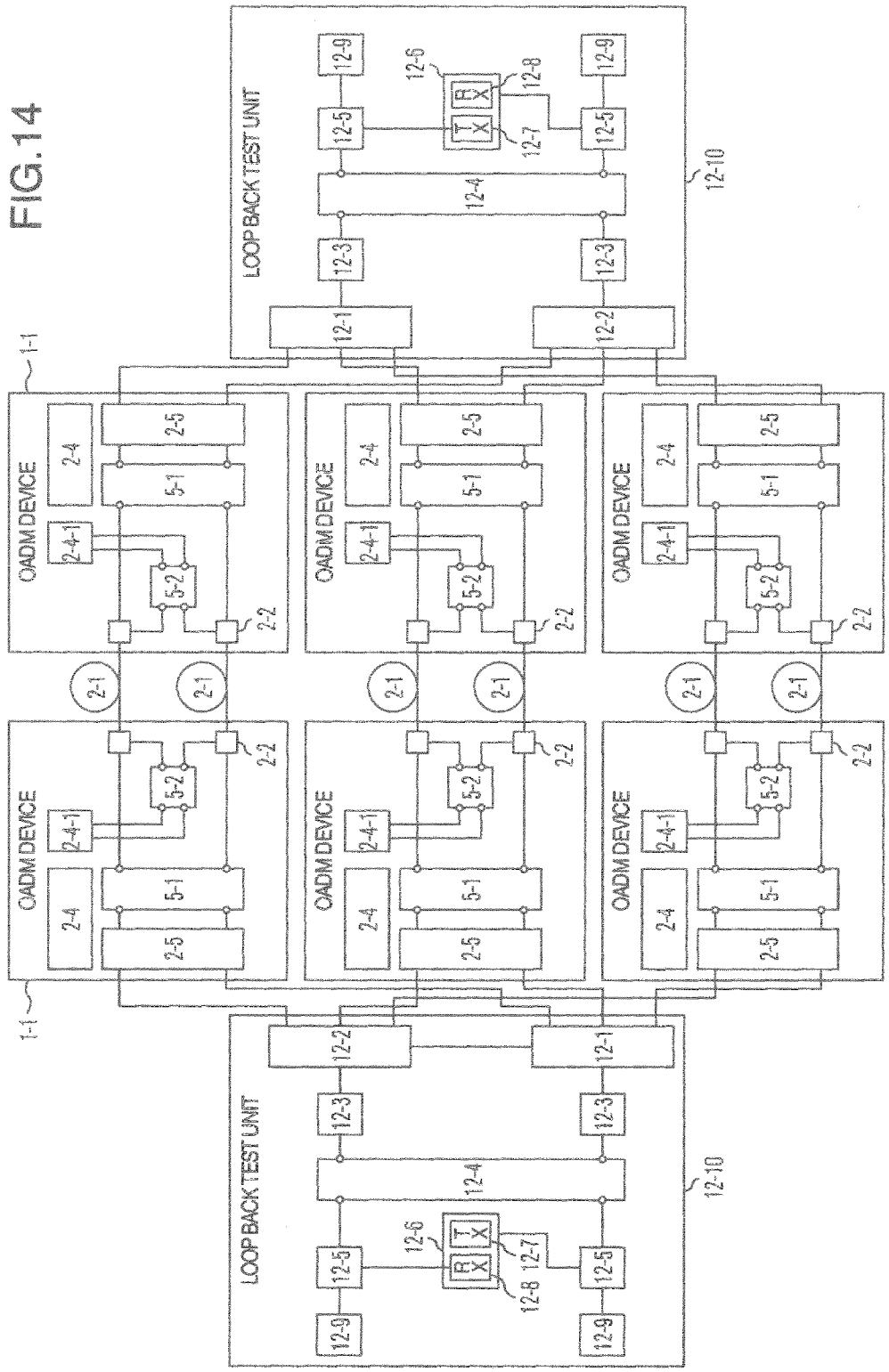
FIG. 14 is a block diagram illustrating a configuration for materializing the optical loop back function in respect of a plurality of OADM devices.

Turning to FIG. 14, an example of configuration of a third embodiment in which a single loop back test unit 12-10 is connected to a plurality of OADM devices 1-1 will be described. The loop back test unit 12-10 is the same as that explained in connection with FIG. 12 but the single loop back test unit 12-10 is connected to the plural OADM devices 1-1. Consequently, the loop back test unit 12-10 is shared by the plural OADM devices and the configuration is advantageous from a standpoint of cost reduction. In FIG. 14, the single loop back test unit 12-10 is connected to three OADM devices 1-1 but it can also be connected to more than three OADM devices 1-1.

Figure 15:
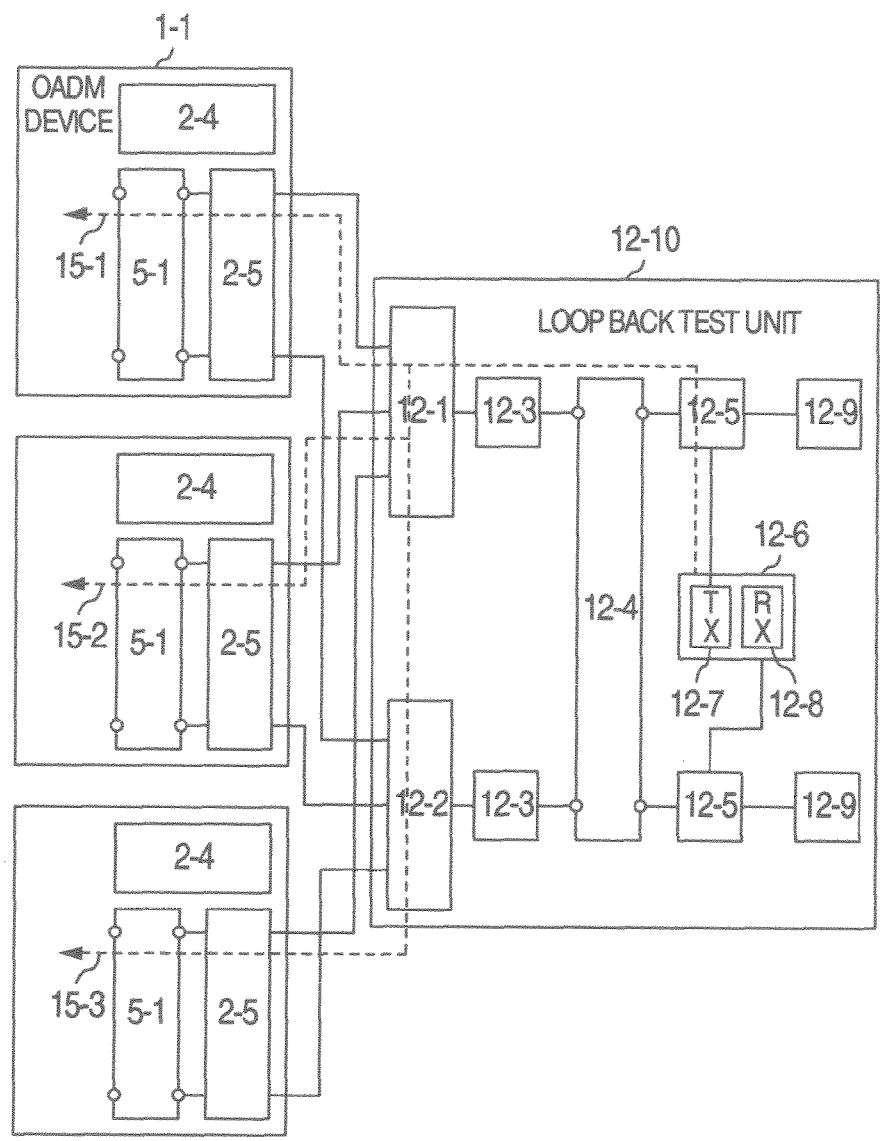
FIG. 15 is a block diagram for explaining the function of an optical splitter unit.

The operation of the optical splitter 12-1 in the third embodiment will be described with reference to FIG. 15. The optical splitter 12-1 mounted in the loop back test unit 12-10 is arranged on the transmission side of light source 12-6. Therefore, a test light ray outputted from the transmitter 12-7 is split in the optical splitter 12-1, so that a test light ray 15-1 directed to the upper OADM device 1-1, a test light ray 15-2 directed to the middle OADM device 1-1 and a test light ray 15-3 directed to the lower OADM device 1-1 are inputted simultaneously. This ensures that the loop back test can be carried out at a time in respect of the plural OADM devices. The optical splitter 12-1 can be merged into the optical switch 12-2 but in this case, a test light ray is selectively inputted to only one, subject to execution of loop back test, of the plural OADM devices connected to the loop back test unit 12-10. Namely, when the test is to be executed for the upper OADM device, the optical switch unit 12-2 is switched to the upper OADM device so as to send the test light ray 15-1 to the upper OADM device but no test light ray is sent to the middle and lower OADM devices 1-1.

Figure 16:
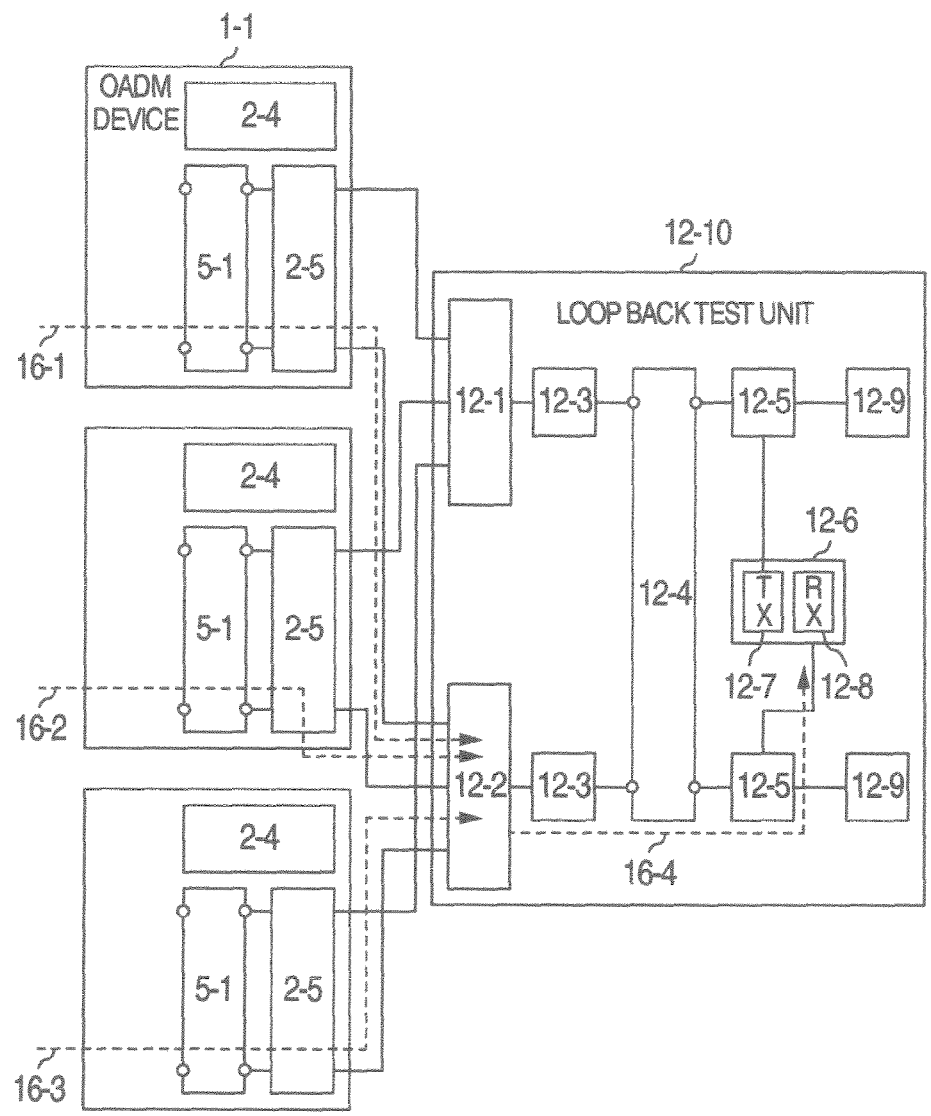
FIG. 16 is a block diagram for explaining the function of the optical switch unit.

The operation of the optical switch 12-2 in the third embodiment will be described with reference to FIG. 16. The optical switch 12-2 mounted inside the loop back test unit 12-10 is arranged on the reception side of the light source 12-6. Therefore, the optical switch 12-2 selects any one of test light rays 16-1, 16-2 and 16-3 from the upper, middle and lower OADM devices 1-1, respectively and inputs a test light ray as a result of the selection to the receiver 12-8. Thus, a problem can be prevented in which when loop back tests are carried out from the plural OADM devices at a tine plural test light rays 16-1, 16-2 and 16-3 are inputted at a time to the light source 12-6, thus failing to make a decision as to which OADM the test light ray is inputted from.

As set forth so far, the result of loop back function is decided (detected) in accordance with the presence/absence of the folding signal. In other words, the presence/absence of loop back is decided by receiving signals folded and returned by the optical switch at the receiver 4-3 of external device 4-1, the control light processing unit 2-4-1 and the receiver 12-8 of loop back light source 12-6.

It should be further understood b those skilled in the art that although the foregoing description has been made on embodiments of the invention, the invention is not limited thereto and various changes and modifications may be made without departing from the spirit of the invention and the scope of the appended claims.

The invention claimed is:

1. An optical transmission apparatus comprising:
   a wavelength multiplexer unit configured to multiplex wavelengths of input/output light rays;
   a first optical switch configured to input/output the light rays to/from said wavelength multiplexer unit;
   a control light processing unit configured to input/output control light rays;
   a control light controlling unit configured to perform multiplexing or splitting between a control light ray and a light ray delivered out of said wavelength multiplexer unit;
   a second optical switch arranged between said control light processing unit and said control light controlling unit, the second optical switch configured to input/output the control light ray; and
   a supervisory control unit configured to control an on/off state of a control so as to fold the inputted light ray with respect to said first optical switch and with respect to said second optical switch;
   wherein the second optical switch is configured to switch a path that the control light ray is passed on between the control light processing unit and the control light controlling unit by controlling the on/off state of the control by the supervisory control unit so as to fold the inputted control light ray,
   wherein the control is such that the control light ray from the control light processing unit is folded on a path with respect to the control light processing unit, and the control light ray from the control light controlling unit is folded on a path with respect to the control light controlling unit.

2. An optical transmission apparatus according to claim 1, wherein said optical transmission apparatus is connected to another optical transmission apparatus through transmission paths to mutually transmit/receive light rays to/from different optical transmission apparatus.

3. An optical transmission apparatus according to claim 2, wherein said wavelength multiplexer unit is configured to multiplex input/output signal light rays, and
   wherein said first optical switch is a 2×2 optical switch adapted to switch signal light rays transmitted to the different optical transmission apparatus and signal light rays received from the different optical transmission apparatus.

4. An optical transmission apparatus according to claim 2, wherein said second optical switch is a 2×2 optical switch adapted to switch control light rays transmitted to the different optical transmission apparatus and to control light rays received from said different optical transmission apparatus.

5. An optical transmission apparatus according to claim 2, further comprising a light source of a test light ray and a third optical switch configured to input/output light rays to/from said light source,
   wherein said third optical switch is a 2×2 optical switch configured to fold inputted light rays and to be on/off controlled by said supervisory control unit, and
   wherein the 2×2 optical switch is adapted to switch both of a test light ray transmitted to said different optical transmission apparatus and a test light ray received from said different optical transmission apparatus.

6. An optical transmission apparatus according to claim 1, further comprising a light source of a test light ray and a third optical switch configured to input/output light rays to/from said light source,
   wherein the on/off state of the control that folds inputted light rays is controlled by said supervisory control unit with respect to said third optical switch.

7. An optical transmission apparatus according to claim 6, further comprising a splitter arranged between said third optical switch and said wavelength multiplexer unit and adapted to split said test light ray.

8. An optical transmission apparatus according to claim 6 further comprising a fourth optical switch arranged between said third optical switch and said wavelength multiplexer unit and adapted to switch said test light ray outputted from said wavelength multiplexer unit.

9. An optical transmission apparatus according to claim 6, further comprising a tunable filter arranged between said third optical switch and said wavelength multiplexer unit.

10. An optical transmission apparatus according to claim 1, wherein said supervisory control unit is configured to receive, from an externally arranged supervisory control terminal, a command for setting said first optical switch.

11. An optical transmission apparatus according to claim 1,
    wherein when the control to fold the inputted control light ray is ON, the second optical switch is configured to select a path that the control light ray from the control light processing unit is folded on with respect to the control light processing unit and a path that the control light ray from the control light controlling unit is folded on with respect to the control light controlling unit, and
    wherein when the control to fold the inputted control light ray is OFF, the second optical switch is configured to select a path that the control light ray is passed on between the control light processing unit and the control light controlling unit.

12. An optical transmission method based on an OADM device having a wavelength multiplexer unit, a first optical switch, a second optical switch, a control light processing unit and a control light controlling unit, the method comprising:
    multiplexing wavelengths of input/output light rays by said wavelength multiplexer unit;
    switching light rays outputted from said wavelength multiplexer unit by said first optical switch;
    switching a control light ray outputted from said control light processing unit by said second optical switch;
    multiplexing light rays switched by said first optical switch with a control light ray switched by said second optical switch via said control light controlling unit;
    transmitting a resulting light ray to an opposing OADM device;
    splitting light rays received from said opposing OADM device by said control light controlling unit into a control light ray and a different light ray;
    inputting the different light ray to said first optical switch and switching the inputted light ray; and
    inputting the control light ray split by said control light controlling unit to said second optical switch and switching the inputted control light ray, wherein said first optical switch folds the inputted light ray and returns it to an input originator when the control to fold the inputted light ray is ON, and wherein said second optical switch folds the inputted control light ray and returns it to an input originator when the control to fold the inputted control light ray is ON.

13. An optical transmission method according to claim 12, wherein said OADM device is connected to an external device and transmits/receives a signal light ray to/from said external device, said method further comprising:

making a decision as to whether generation of a fault is present or absent in a transmission path with respect to a signal light ray transmitted from said external device by deciding whether or not the signal light ray transmitted from said external device is folded by the control of said first optical switch.

14. An optical transmission method according to claim 12, wherein said OADM device is connected to an external device so as to transmit/receive a signal light ray to/from said external device, and wherein said method further comprises making a decision as to whether generation of a fault is present or absent in a transmission path with respect to a control light ray transmitted from said control light processing unit by deciding whether the control light ray transmitted from said control light processing unit is folded by the control of said second optical switch.

15. An optical transmission method according to claim 12, further comprising:

outputting a test light ray from a light source; and switching the test light ray by a third optical switch adapted to input/output the test light ray, wherein when the function to fold the inputted light ray is ON, said third optical switch folds the inputted light ray and transmits it to an input originator.

16. An optical transmission method according to claim 15, further comprising making a decision as to whether generation of a fault is present or absent in a transmission path with respect to a test light ray outputted from said light source by deciding whether the test light ray transmitted from said light source is folded by the control of said first optical switch.

* * * * *